United States Patent [19]

Jenkins et al.

[11] 4,375,892
[45] Mar. 8, 1983

[54] OIL WELL DRILLING RIG MOVER

[75] Inventors: Cecil Jenkins; Joseph R. Woolslayer, both of Tulsa, Okla.

[73] Assignee: Lee C. Moore Corporation, Tulsa, Okla.

[21] Appl. No.: 257,775

[22] Filed: Apr. 27, 1981

[51] Int. Cl.³ .............................................. B60P 1/02
[52] U.S. Cl. ................................ 280/43.23; 52/143; 166/79; 173/23; 180/DIG. 2; 280/81 R; 280/109; 280/656
[58] Field of Search ................. 180/24.01, DIG. 2; 280/43, 43.11, 43.23, 43.24, 85, 785, 109, 656, 81 R, 81 B; 52/143; 166/79; 173/23; 414/495, 498

[56] References Cited

U.S. PATENT DOCUMENTS

| | | | |
|---|---|---|---|
| 1,340,414 | 5/1920 | Schneider | 280/81 B |
| 2,469,087 | 5/1949 | Swartz | 280/81 R |
| 2,663,375 | 12/1953 | Caldwell | 280/81 R |
| 3,262,592 | 7/1966 | Mannon | 280/81 R |
| 3,362,553 | 1/1968 | Weinmann | 280/43.23 |
| 3,429,585 | 2/1969 | Ross | 280/43.23 |
| 3,754,361 | 8/1973 | Branham et al. | 52/143 |
| 4,324,077 | 4/1982 | Woolslayer | 280/43.24 |

*Primary Examiner*—David M. Mitchell
*Attorney, Agent, or Firm*—Brown, Flick & Peckham

[57] ABSTRACT

An oil well drilling rig mover is formed from a pair of laterally spaced dollies detachably connected by braces between them. Each of the dollies includes a beam for resting on a support, and a pair of laterally spaced wheels at each end of the beam. An arm extends outwardly from the outer end of a tiltable support member that is pivotally connected to the end of the beam beneath it. The arm can be connected to the support member in either of two laterally spaced positions. Extending downwardly from the outer end of each arm is a rotatable shaft, the lower end of which is connected to the central portion of the axle for the wheels. The support members at the opposite ends of a beam can be tilted away from each other to lift the beam. The two beams and the braces between them form a skid base for a drilling rig which can be moved laterally by turning the shafts 90 degrees.

9 Claims, 10 Drawing Figures

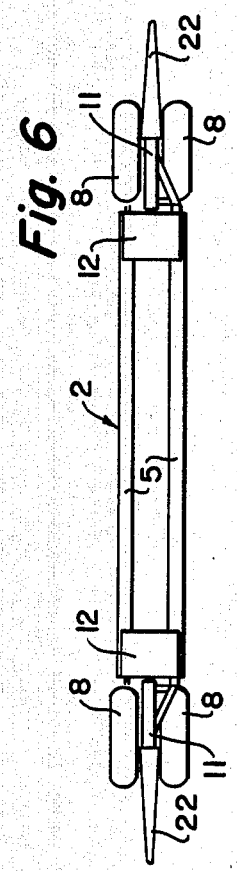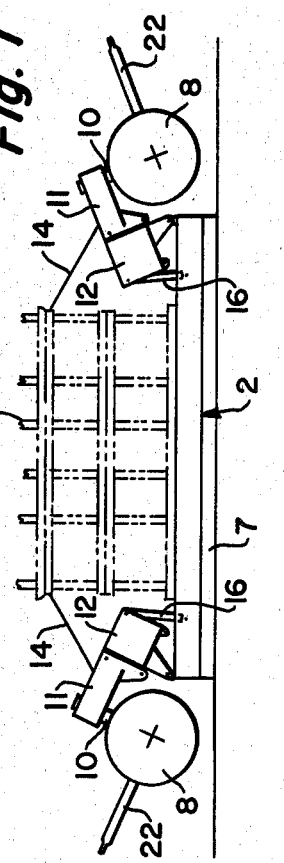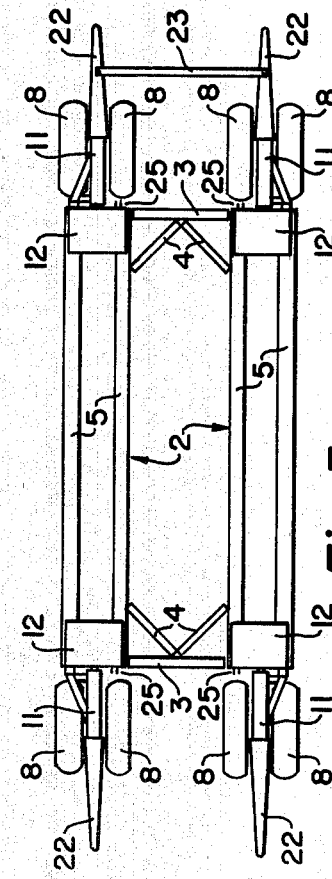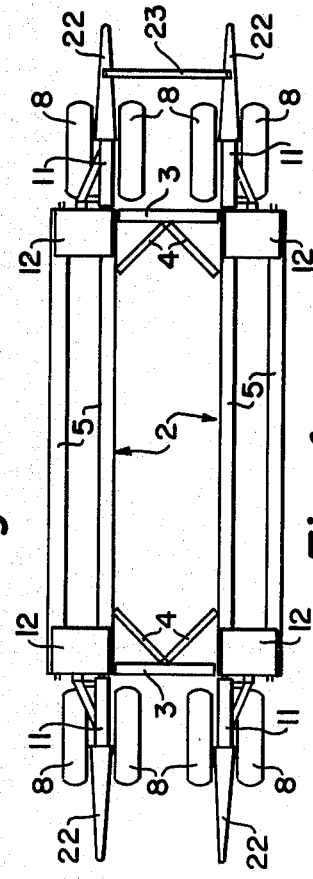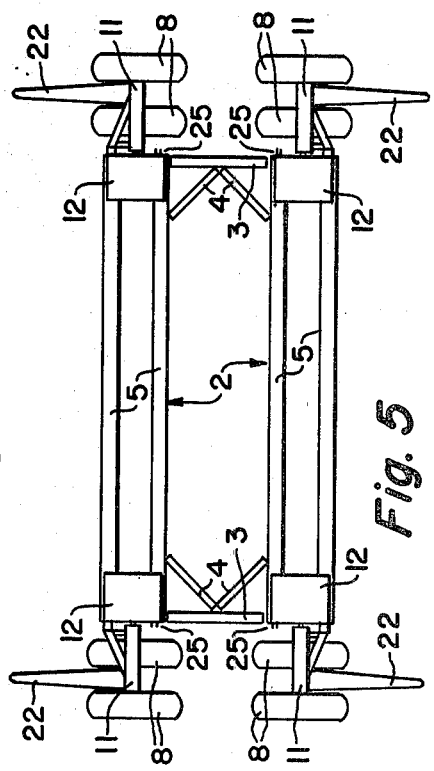

OIL WELL DRILLING RIG MOVER

In our copending patent application Ser. No. 88,555, filed Oct. 26, 1979 and issued Apr. 13, 1982 as U.S. Pat. No. 4,324,077, a vehicle or mover for transporting an erected oil well drilling rig over land is disclosed. During drilling, the body of the mover is supported by mats resting on the ground, but when it is desired to move the rig, its body is raised relative to its wheels so that the mover then can travel along the ground. However, the rig mover can only travel in a longitudinal direction and if it comes to a narrow bridge, it cannot travel across it.

It is among the objects of this invention to provide a rig mover of the general type shown in our copending application, but which can be moved laterally as well as lengthwise and which can readily be separated into two narrow dollies that can cross a narrow bridge and then be reconnected.

The preferred embodiment of the invention is illustrated in the accompanying drawings, in which FIG. 1 is a schematic side view of the rig mover in well-drilling position;

FIG. 2 is a side view showing the rig mover ready for travel along the ground;

FIG. 3 is a plan view of the mover in its over-the-well position but with its wheels down;

FIG. 4 is similar to FIG. 3 but with the wheels moved inwardly for travel;

FIG. 5 shows the rig mover with the wheels turned 90 degrees for lateral travel;

FIG. 6 is a plan view of one of the dollies in traveling position;

Figure 7:
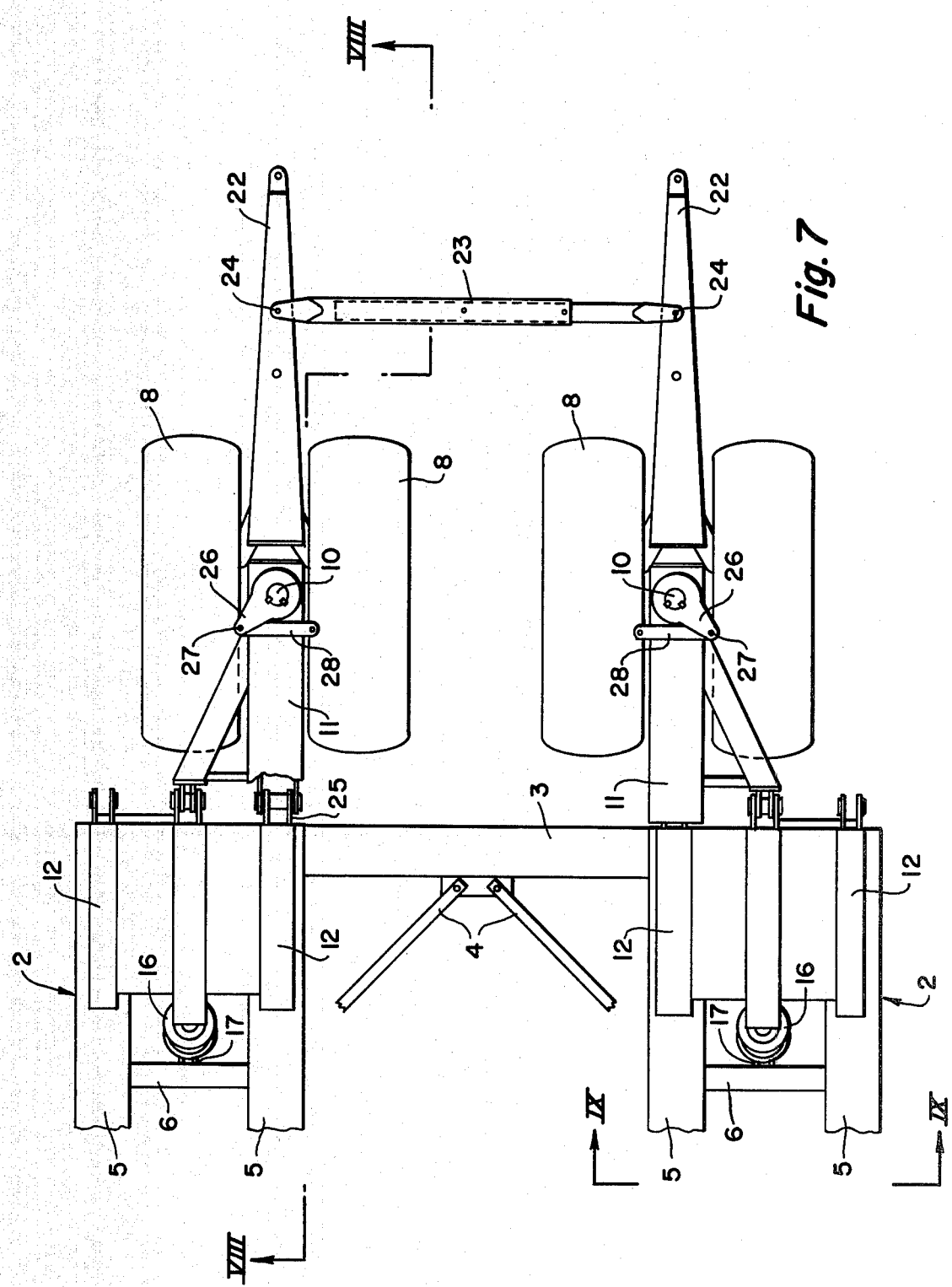
FIG. 7 is a fragmentary enlarged plan view of one end of the rig mover with the wheels in over-the-road position.

Referring to the drawings, a supporting structure 1, indicated in dotted lines in FIGS. 1 and 2, for an erect oil well drilling rig (not shown) rests on a skid base formed as shown in FIGS. 3, 4 and 5 from two laterally spaced beams 2 that are rigidly but detachably connected by means of braces 3 and 4 between them. Preferably, each beam is formed from a pair of laterally spaced girders 5 that likewise are rigidly connected by cross braces 6. During drilling of a well, this skid base rests either directly on the ground, or on one or more skid mats 7 shown in FIG. 1 that can be attached to the bottom of the base.

Figure 8:
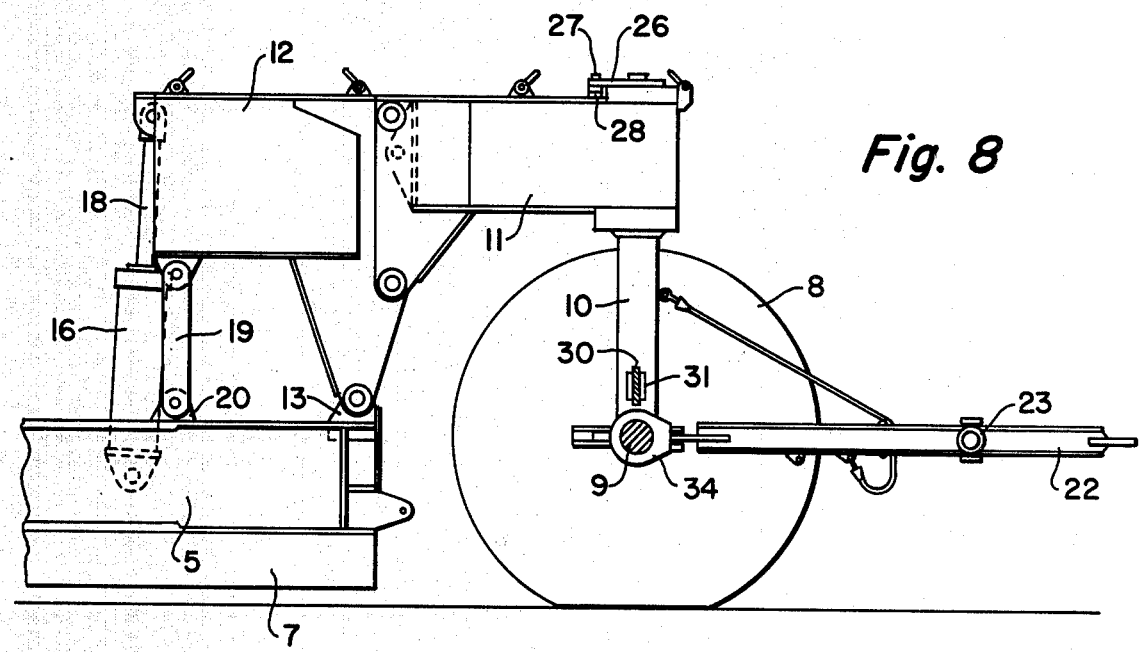
FIG. 8 is a vertical section taken on the line VIII—VIII of FIG. 7.
Figure 9:
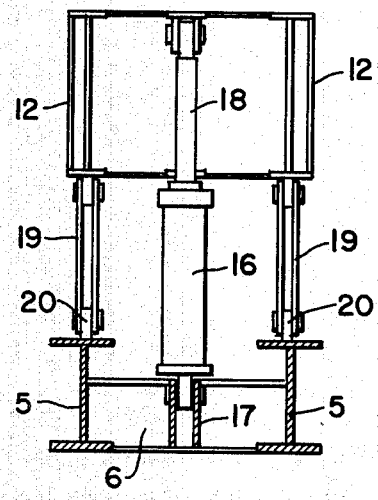
FIG. 9 is a vertical section taken on the line IX—IX of FIG. 7.
Figure 10:
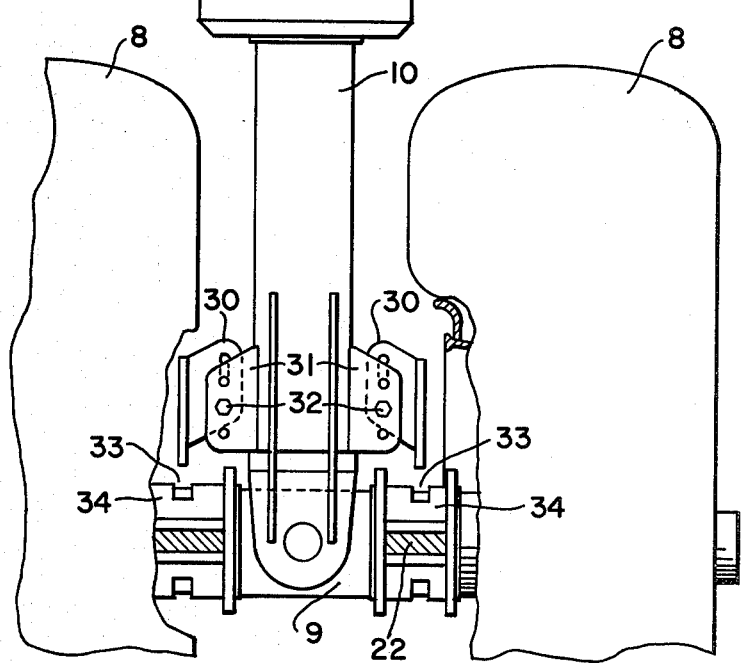
FIG. 10 is an enlarged fragmentary end view showing a pair of wheels partly broken away.

In order to permit the skid base to travel over the ground from one well drilling site to another, there is a pair of laterally spaced wheels 8 at each end of each beam. Each pair of wheels is mounted on the opposite ends of an axle 9 that normally extends transversely of the beams as shown in FIGS. 8 and 10. The lower end of a shaft 10 is pivotally connected to the central portion of each axle on a transverse axis and the shaft extends upwardly through the outer end of a braced arm 11, in which the shaft is rotatably mounted so that it can be turned. The inner end of the arm is rigidly, but detachably, connected to the outer end of a support member 12 that has a pair of downwardly extending portions pivotally connected to brackets 13 (FIG. 8) on the underlying beam on a horizontal axis extending transversely of the beam. Each beam and its wheels form a dolly.

While the skid base is resting on the ground or mats, the outer ends of arms 11 and support members 12 are tilted up. At such times it is best to support the wheels by wire lines 14 (FIG. 1) that connect the arms to structure 1 to relieve the wheels and their bearings of dead-weight loads.

While the rig mover is immobile as a well is being drilled between the dollies, the wheels at each end are spaced their maximum distance apart as shown in FIG. 3 so that there will be room for a truck to be driven in between the dollies to take equipment in. A hydraulic cylinder 16, pivotally connected at its lower end to a bracket 17 in the beam beneath the inner end of each support member 12, has a piston rod 18 projecting from its upper end. When it is desired to move the skid base, the outer end of the piston rod projecting from each cylinder is connected to the inner end of the adjacent support member 12 as shown in FIG. 1. Fluid under pressure then is delivered to the lower ends of the four cylinders, which causes them to tilt the support members of each dolly away from each other. This causes the outer ends of the arms to press down on the wheel axles, which act as fulcrums, while the inner ends of the support members rise away from the skid base. Consequently, support members 12, through their connections to the underlying beams, lift the skid base from the ground until arms 11 are substantially horizontal and shafts 10 are vertical as shown in FIGS. 2 and 8. Then the support members are locked in that position, preferably by means of links 19 that are pinned to the bottoms of the support members and to brackets 20 on beams 2. The piston rods then can be disconnected from the support members until it is time to lower the skid base.

The rig mover then can be pulled away from the well by a suitable vehicle connected to tongues 22 that are fastened to the axles and extend away from the skid base. The tongues at the leading end of the rig mover are held parallel to each other by a cross bar 23 that is pivotally connected to the tongues by removable pins 24. Before the skid base can be moved, braces 3 and 4 at its trailing end must be removed. After the rig mover has been pulled away from the well and the rear braces 3 and 4 replaced, the wheels at each end of the skid base are moved closer together so that they will not be spread too far apart for road travel, as shown in FIGS. 4 and 7. This can be done by disconnecting arms 11 from supporting members 12 and reconnecting them to brackets 25 projecting from the support members at the inner sides of the dollies. Cross bar 23 is an adjustable telescoping bar than can be shortened to compensate for the reduced distance between the tongues at its ends. When a new drilling location is reached, the piston rods are connected to the support members again, links 19 are disconnected and the hydraulic cylinders allow the skid base to slowly descend between the wheels at its ends until mat 7 rests on the ground.

If it is desired to move the skid base laterally, cross bar 23 can be disconnected from tongues 22 and all four tongues can be swung 90 degrees to turn the wheels at right angles to the skid base as shown in FIG. 5.

Means are provided at the upper ends of shafts 10 to lock them in either of their two positions. For over the road travel, the trailing shafts are locked but the leading shafts are left free so that the rig mover can be steered. The locking means for each shaft 10 preferably consists of a short lever 26 rigidly mounted on the upper end of the shaft and provided in its outer end with a hole for receiving a locking pin 27 that can extend into a hole in either end of a bar 28 extending across the top of arm 11 and secured thereto. When the locking pin extends through the hole in one end of the bar the wheels are positioned for longitudinal travel of the dolly. When the pin is in the other end of the bar the wheels have been turned 90 degrees for lateral movement of the dolly.

Sometimes the road over which the rig mover must travel includes a bridge that is too narrow for the rig mover to traverse. In such a case, the two dollies are separated by removing all of the braces 3 and 4 and, of course, cross bar 23. At this time the wheels must be in their outer position as shown in FIG. 3, so that arms 11 will be located along the central longitudinal axis of each beam 2. At this time each dolly appears as indicated in FIG. 6. The two narrow dollies then can be moved in succession across the bridge and then be reconnected by braces 3 and 4. Part of the mast-supporting structure 1 on each dolly may be carried across the bridge with the dolly but the rest of the components will have to be broken down to truck load size and trucked across the bridge and then reassembled on the skid base for further drilling.

While the two dollies are connected, it is desirable that axles 9 be able to tilt as the wheels travel over uneven ground. This is permitted by the pivotal connection of shafts 10 to the axles. However, when the dollies are separated for individual travel, such tilting must be prevented. Otherwise, shafts 10 would fall sideways onto one of the wheels at each end of the dolly, and beam 2 would be tilted sideways. Locking of the axles at right angles to shafts 10 can be accomplished, as shown in FIG. 10, by mounting a pair of locking members 30 for sliding vertical movement on a pair of brackets 31 projecting from opposite sides of each shaft 10. The locking members normally are held in an upper inoperative position by pins 32 extending through them and the bracekts. When it is desired to lock the axle, the pins are removed and the locking members allowed to slide down until their lower ends project into slots 33 in sleeves 34 on the axle. Then pins 32 are inserted in the bottom holes in the brackets to hold the locking members in their lower position, in which they prevent relative movement between the shaft and axle. The forked inner end of a tongue 22 also is secured to sleeves 34.

Although the term "wheels" has been used herein, it is to be construed broadly as also covering any means that permit the skid base to travel over the ground, such as the well-known Athey tracks.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. An oil well drilling rig mover comprising a pair of laterally spaced dollies, braces between the dollies and detachably connected thereto, each of the dollies including a beam for resting on a support, a pair of laterally spaced wheels at each end of the beam, an axle connecting each pair of wheels and normally extending transversely of the beam, a tiltable support member above each end of the beam, means pivotally connecting each support member to the underlying beam on a horizontal axis extending transversely of the beam, an arm extending outwardly from the outer end of each of said support members, means for selectively rigidly connecting each arm to the adjoining support member in either of two laterally spaced positions, a rotatable shaft extending downwardly from the outer end of each arm, means connecting the lower end of the shaft to the central portion of the underlying axle of a pair of said wheels, and means connected to the beam and support members for tilting the support members away from each other to lift said beam relative to said wheels, the two beams and the braces forming a skid base for a drilling rig, and means for turning said shafts to permit the skid base to be moved laterally.

2. An oil well drilling rig mover according to claim 1, in which in one of said laterally spaced positions of said arms they are disposed substantially midway between the opposite sides of the adjoining beam, and in the other of said positions the arms are disposed at the inner side of the adjoining beam, whereby in said one position the two pairs of wheels at each end of a beam are located farther apart than in said other position.

3. An oil well drilling rig mover according to claim 1, including releasable means for locking said shafts against turning.

4. An oil well drilling rig mover according to claim 1, in which the lower end of each shaft is pivotally connected to the adjoining axle on a transverse axis substantially perpendicular to the shaft, and retractable means is provided for locking the shaft against pivotal movement on the axle.

5. An oil well drilling rig mover according to claim 1, including means for locking said support members against tilting back toward each other when they have lifted the skid base.

6. An oil well drilling rig mover according to claim 5, in which said locking means include rigid links detachably connecting the tilted support members to said beams.

7. An oil well drilling rig mover according to claim 1, in which said member-tilting means are fluid pressure cylinder means connected to each beam and said support members inwardly of said pivotal means.

8. An oil well drilling rig mover according to claim 1, in which said shaft-turning means at each end of the skid base are normally parallel tongues extending outwardly from said axles, a cross bar normally is disposed between parallel tongues, and detachable means extending down through the cross bar and the adjoining tongues pivotally connect the bar to the tongues.

9. An oil well drilling rig mover according to claim 1, in which said member-tilting means are fluid pressure cylinder means connected to each beam and said support members inwardly of said pivotal means, and said rig mover includes rigid links detachably connecting the inner ends of the tilted support members to said beams to prevent the support members from tilting back toward each other when they have lifted the skid base.

* * * * *